Nov. 6, 1934.　　　M. EWALD　　　1,979,322
PEAR TREATING APPARATUS
Filed July 18, 1932　　　4 Sheets-Sheet 2
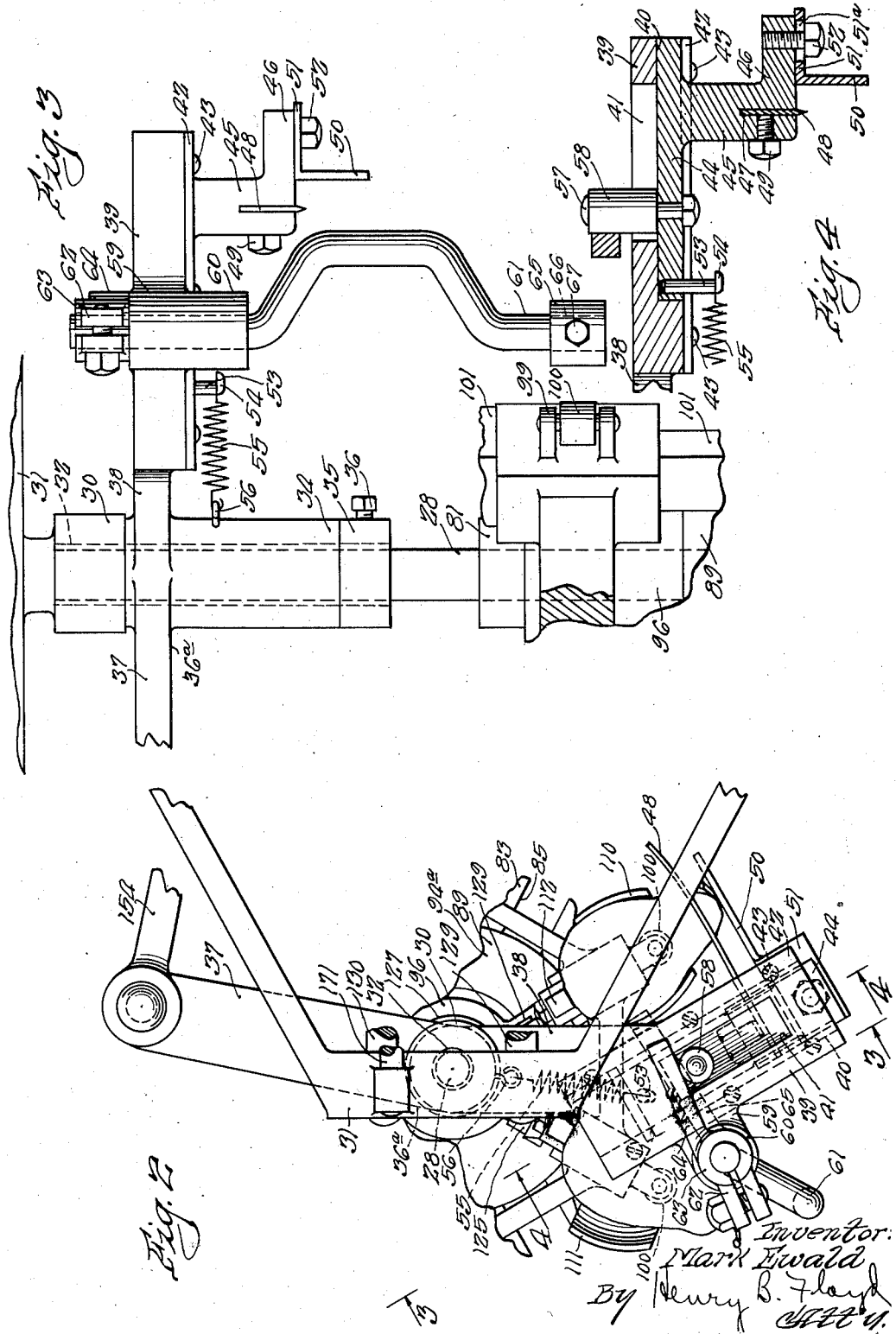

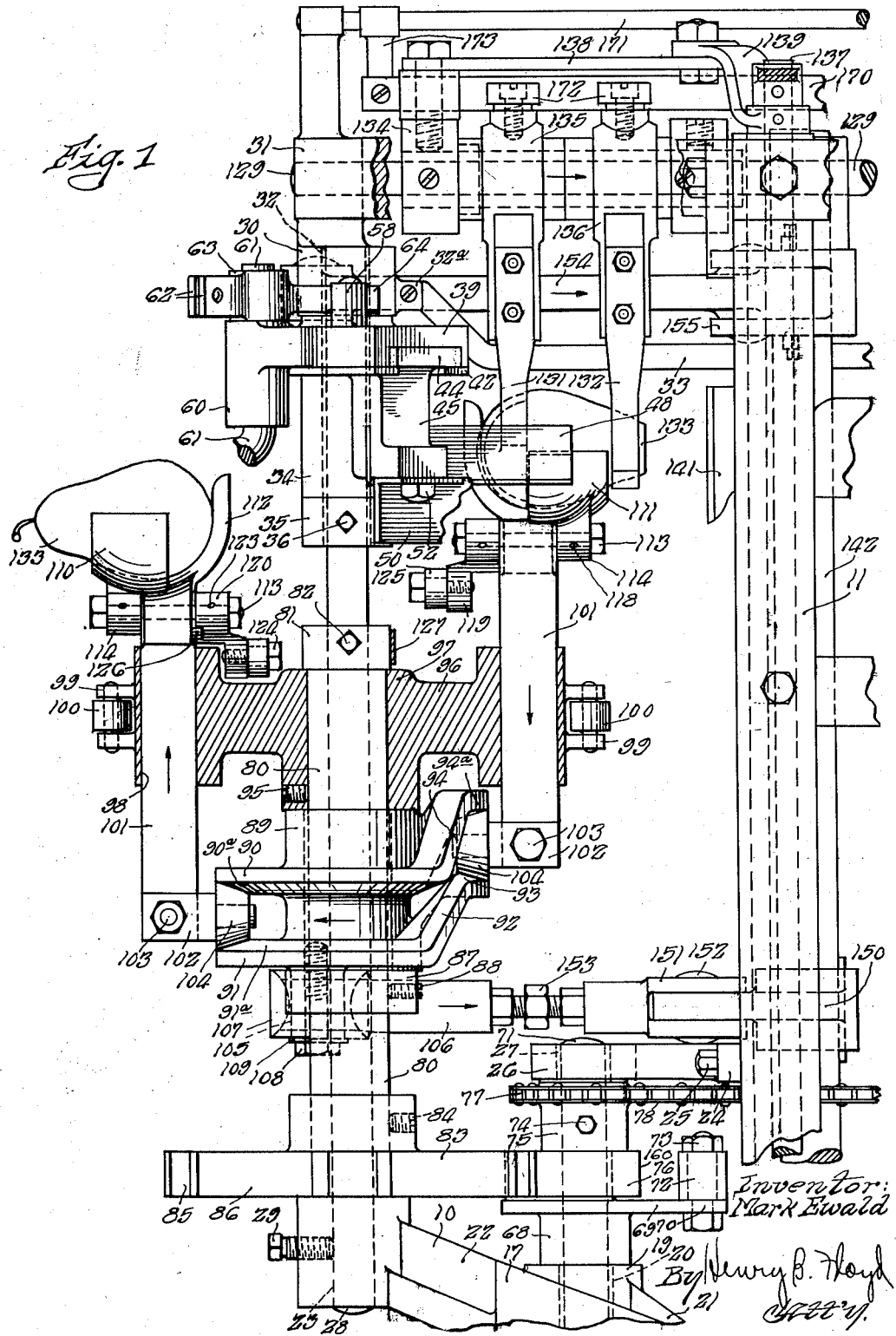

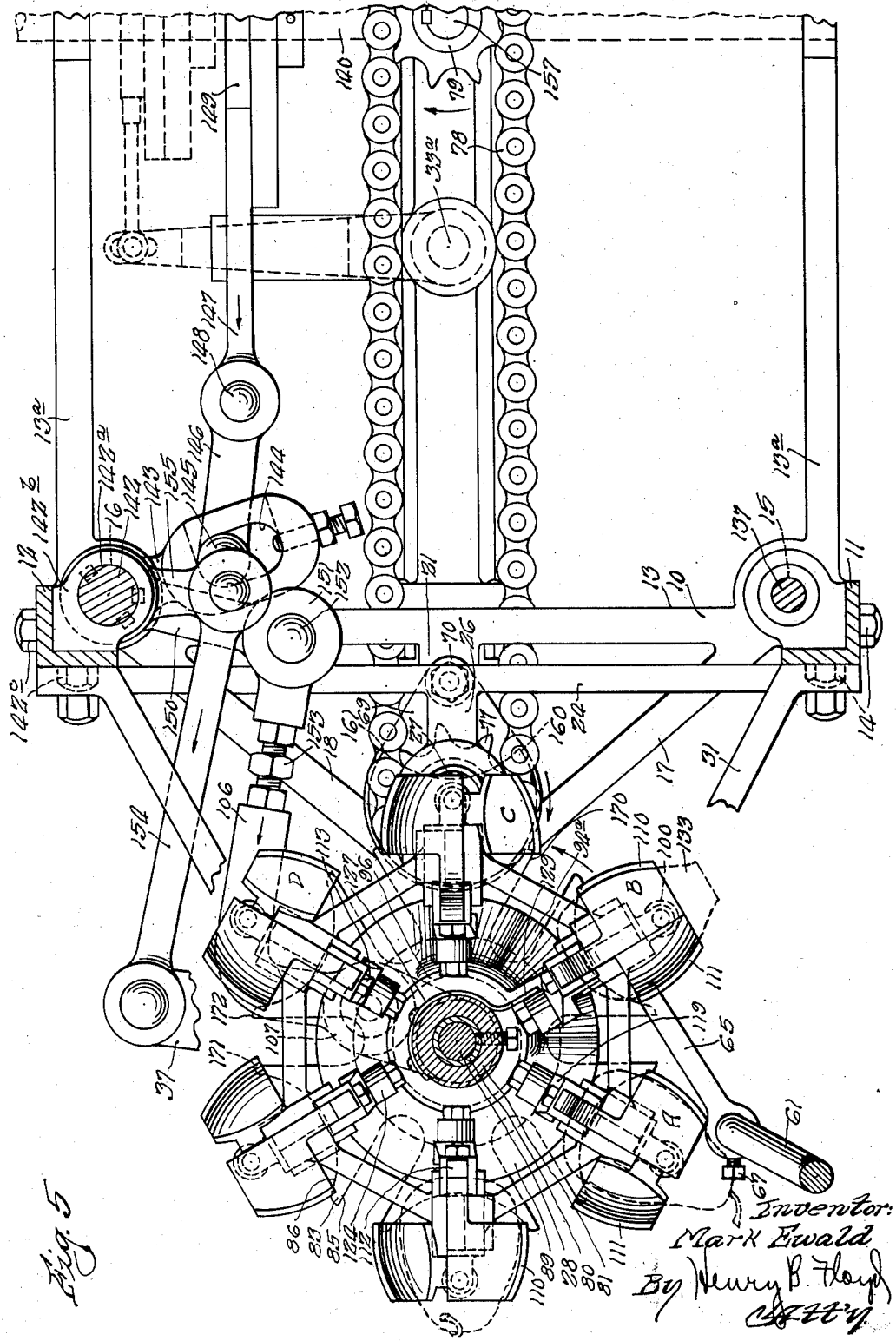

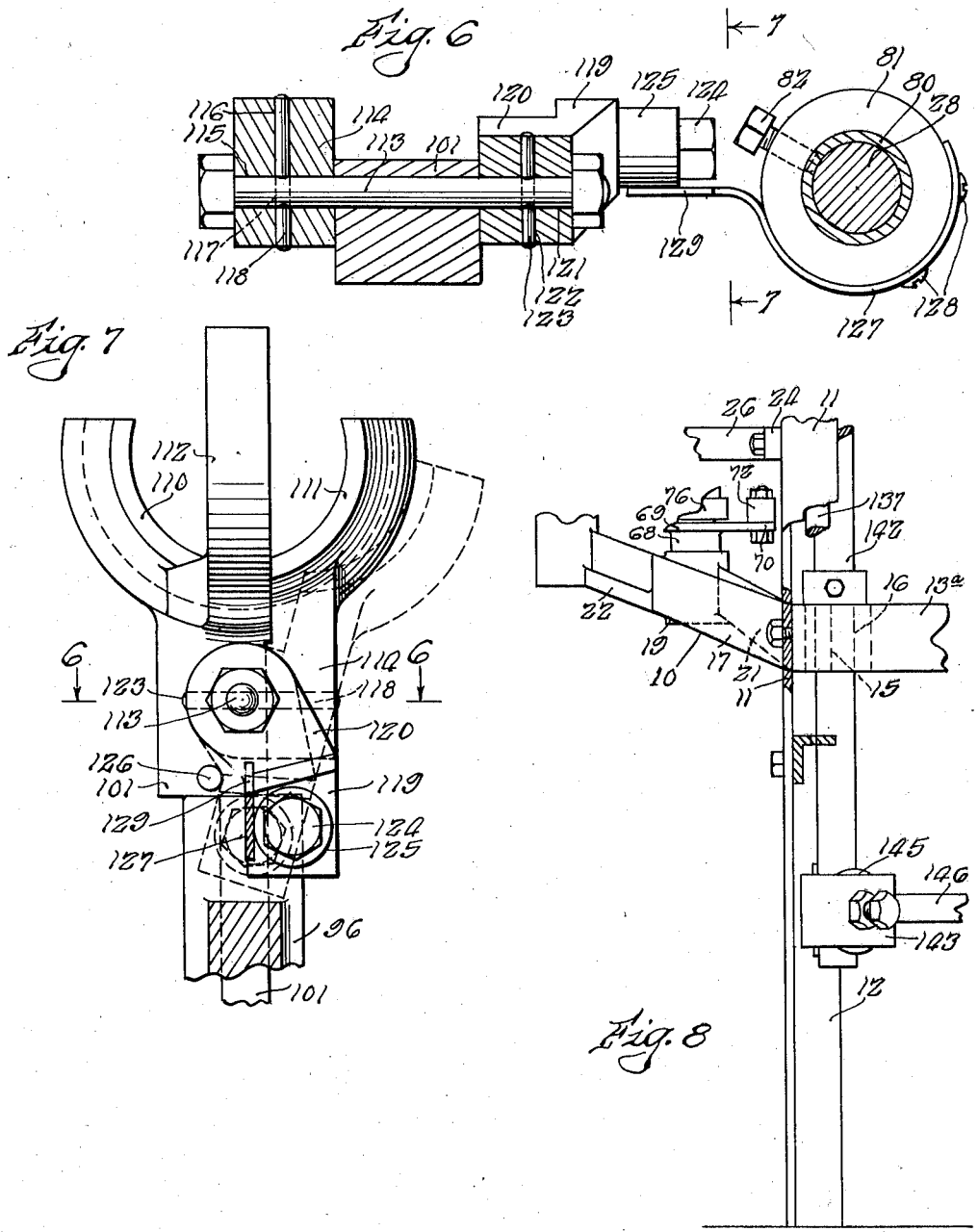

Patented Nov. 6, 1934

1,979,322

UNITED STATES PATENT OFFICE 1,979,322

PEAR TREATING APPARATUS

Mark Ewald, Olympia, Wash., assignor to Special Equipment Company, Portland, Oreg., a corporation of Oregon Application July 18, 1932, Serial No. 623,167

14 Claims. (Cl. 146—81)

This invention has to do with a fruit treating machine and relates particularly to a part of such machine for severing the stem end from a fruit pursuant to feeding the fruit thereto.

The present invention is in corollary to an application having Serial Number 421,954, in the name of Mark Ewald, filed January 20, 1930, and entitled "Slicer and peeler." In said earlier application, a similar machine was described as a whole. The drawings and specification therein included a disclosure of an instrumentality functioning to stem fruit contemporaneously to the feeding of the fruit to a paring machine for further treatment.

It is an object of the present invention to provide an improved device adaptable to a fruit treating machine and for stemming the fruit preliminary to further treatment thereof in the machine.

Another object of the present invention is to provide a device of the type set forth having an improved means for receiving fruit.

Still another object of the present invention is a device for supplying fruit to a peeling and splitting machine, or the like, and which is operated in synchronism with the peeling and splitting machine to bob the stems from the fruit.

A further object of the present invention is to provide a bobbing mechanism for feeding fruit to a splitting and peeling machine and adapted to receive operative energy from such splitting and peeling machine.

The above enumerated objects and such other desirable objects as are made apparent in the following description reside in the novel arrangement of the elements and their improved construction and combination.

In the accompanying drawings hereby made a part of this application and in which like reference characters designate similar parts:

Figure 1 is a fragmentary side elevation of a device embodying the invention;

Figure 2 is a fragmentary plan view of the fruit bobbing part of the device;

Figure 3 is a perspective view of the parts shown in Figure 2, such view being taken along the line 3—3 of Figure 2;

Figure 4 is a fragmentary view of the stemming parts taken in cross section along the line 4—4 of Figure 2;

Figure 5 is a plan view of the device illustrating its attachment to a splitting and paring machine;

Figure 6 is a sectional view taken through the shank of a fruit cup as indicated at the line 6—6 of Figure 7;

Figure 7 is a lateral view of a fruit cup as taken from its inner end; and

Figure 8 is a fragmentary view of a standard of the pear splitting and paring machine and illustrating the attaching means of the present feeding device.

Attention is first directed to Figures 1, 5 and 8. A bracket 10 is illustrated. It is secured to upright frame members 11 and 12 of a splitting and peeling machine. Bracket 10 is the lower support means for the present feeding and stemming device. It is generally of a triangular formation. A transverse and horizontal member 13, common to the bracket 10, and a rectangular frame member 13a are between standards 11 and 12 and held by studs 14.

Vertical bearings 15 and 16 are disposed within the two ends of element 13. Such bearings are disposed partially within the angle members 11 and 12. Component arms 17 and 18 extend symmetrically at an upwardly converging angle from the ends of bar 13 to intersect in a block 19 containing a bearing 20. Bearing block 19 is supported by a short cross member 21 enjoining the bar 13. Projecting backwardly from bearing block 19 opposite to a bar 21 and in the extended and inclined plane of frame parts 17 and 18 is a trunk 22 terminating in a vertical bearing 23. Thus, the frame 10 contains four bearings as indicated by numerals 15, 16, 20 and 23.

A cross bar 24 is firmly anchored between the frame uprights 11 and 12 by means of bolts 25. Projecting from the bar 24 is a bracket 26 which presents a bearing 27 in vertical alinement to and above bearing 20.

The lower extremity of a vertical rod 28 is inserted into bearing 23, and is there held against longitudinal and radial displacement by a set screw 29. The extreme upper end of the shaft 28 is seated in a journal block 30 depending from a trapezoidal frame 31 and providing an inverted recess 32. An apertured lug 32a at the front side of journal block 30 provides for the anchorage of an end of a flat and distorted bar 33 which is completely described in the hereinabove referred to application. The bar 33 extends inwardly of the machine to attach to certain collars (not shown) containing a rotating shaft 33a and to prevent rotation of said collars with said shaft.

Adjacent to and below the journal block 30 is a sleeve 34 disposed to oscillate about the shaft 28. A collar 35 contiguous to the lower end of the sleeve and fixedly held by set screw 36 coacts with the journal block 30 to secure the sleeve 34 against axial displacement of the rod 28.

Sleeve 34 provides a hub for a constituent compound lever 36a comprising members 37 and 38. The member 38 enjoins, at its end, a rectangular guide block 39 which is slightly angular thereto. (See Figures 2, 3 and 4.) Within the bottom face of block 39 is a longitudinal groove 40 of rectangular cross section and open to its end. Centered above said groove in the upper face of the block is a rectangular aperture 41, which is communicative to said groove.

Two metallic strips 42 secured to the under face of the block 39 by means of screws 43 aline either side of the groove 40 and overlap said groove, thus forming a race wherein a slug 44 may reciprocate. An integral leg 45 depends from near the forward end of the member 44, intermediate the straps 42, to continue into a foot 46. A deep groove 47 transgressing the pendulent elements 45 and 46 describes a course tangent to the axis in shaft 28.

Within said groove 47 is placed a blade 48 to be placed in position by a stud 49. An angle member 50 having a flange 51 is positioned parallel to the instrument 48 and there retained by the clamping of the flange 51 to the under side of the foot 46 by standard means 52.

In the left end of the bolt 44, Figure 4, is a downwardly projecting pin 53 having a hook 54. A coiled contraction spring 55 is mounted therebetween and a suitable hook 56 secured in hub 34. Protruding from the upper face of the slug 44, through aperture 41, and well beyond the upper exposed face of block 39 is a journal provided by bolt 57 having thereon a roller bearing 58.

An ear 59 containing a bearing 60 of considerable axial length (Figure 3) projects from the outer edge of guide plate 39. Carried within the bearing 60 is a compound crank 61. Said rod 61 is held against gravitational displacement by means of a split collar 62 at a hub 63 of an arm 64. At the lower end of the crank 61 is a horizontal bar member 65 secured thereto by means of an aperture 66 and a screw 67.

The numeral 68 (Figure 1) indicates an offset sleeve which is integral with a flat plate 69 providing a point 70. Hub 68 is shrunk onto the shaft 71 which is carried in bearings 20 and 27, and is positioned contiguously to the block 19 to measurably place plate 69. Mounted at 70 is a roller bearing 72 which is journaled on a bolt 73.

Above and adjacent to the member 69 and fixedly attached to shaft 71 by suitable means 74 is a collar 75 having at its lower end a circular bearing surface 76, and at its upper end a sprocket 77. A chain 78 engaging the sprocket 77 cooperates with a driving means 79 forming a part of the fruit treating machine.

Rotatively placed on rod 28 is a sleeve 80, between bearing 23, and a stop 81. The latter is fastened in a stable manner to shaft 28 by a set screw 82. Upon the sleeve 80 is a Geneva cam member 83. The latter is provided with a set screw 84 whereby attachment is had to said sleeve for mutual rotation of the sleeve and cam. The cam 83 is shown in Figure 5 as having six deep radial grooves 85 alternately spaced about its circumference, with an equal number of arcuate sections 86. Roller bearing 72 and circular cam 76 are in direct alinement with the Geneva cam and operate in conjunction with grooves 85 and concave sections 86 respectively as later described.

Above the gear 83 is a collar 87. It is adjoined to the sleeve 80 by a standard means 88. The sleeve 80 provides a journal for a compound circular cam member 89 which rides upon the collar 87. An upper and a lower flange 90 and 91, respectively, present opposed convergent camming faces 90a and 91a. The lower flange 91 embodies an incline 92, an elevated surface 93 and a declination (not shown) on the opposite side of the surface 93 from the inclination 92. The upper flange 90 is articulated so that there is a fixed vertical distance between the two faces 90a and 91a throughout their extent. Opposite to the inclination 92 is an inclination 94, and an elevated section 94a is above the section 93. A declination (not shown) in the upper flange beyond the section 94a opposes the above mentioned declination in the lower flange 91.

Depending from the lower edge of the track 91 is a spool 105 which is centrally drilled and tapped. An L shaped connecting rod 106 with a bearing head 107 is operatively attached to the cam 89 by telescoping the bearing 107 over the spool 105 where it is held by a bolt 108 and a flat washer 109 under the head of said bolt.

Immediately above cam 89 and secured to sleeve 80 to rotate therewith by means of a screw 95 is a turret 96 comprising a hub 97. Member 96 is hexagonal and has at each vertex a vertical bearing 98 of rectangular cross section. The ears 99 confining a roller 100 are disposed on the side walls of the turret or spider 96 in radial alinement with the bearings 98.

Bars 101 are within bearings or slots 98 and are of a cross section congruent to that of said slots. Said bars 101 are disposed to reciprocate therein. Bifurcated spindles 102 depending from the lower end of each of the bars 101 receive such bars within the divided portions. A normal position to the bars is maintained through the agency of bolts 103. A truncated roller 104 is provided on a suitable bearing at the inwardly directed end of each spindle 102 to wedge between converging cam faces 90a and 91a thereby preventing displacement of said roller.

A fruit conveying cup comprising side members 110 and 111 is on the top of each staff 101 and a back leaf 112 next to the center of the turret 96. Members 110 and 112 are cast integral with the stem 101 as is shown in Figure 7, which view is taken along the line 7—7 of Figure 6.

A bolt 113 is carried in the reciprocating element 101 just below the fruit carrying cup and is free to oscillate in said element. Side member 111, which is opposed and complemental to the fixed member 110, extends downwardly into a rectangular shank 114 providing a bearing 115 which is traversed by a keyway 116. Within the shaft 113 is a hole 117. The cup member 111 is assembled with the shaft 113 by turning the shaft until the hole 117 and the keyway 116 are alined for receiving a pin 118.

Likewise, at the opposite end of the shaft 113, a crank lever 119 having a collar 120 with a bearing 121 and a keyway 122 is anchored to the shaft by a key 123. At the free end of the crank 119 is a wrist pin 124 having thereon a roller bearing 125.

Since the center of mass of the crank 119 and fruit cup member 111 is to the side of the rotating axis in the shaft 113, said jaw or cup member and crank are disposed to rotate the shaft 113 so that the member 111 will normally assume the open position, shown by dotted outline in Figure 7. Further pivoting is prohibited by a stop in the form of a small pin 126 anchored in the side of the staff 101 and projecting into the path of travel of the crank lever 119. At this time note will be made of a flat curved spring arm 127 attached to the collar 81 by means of screws 128. A short straight section 129 of the arm 127 is presented to the path of travel of the rollers 125, the reason for which will be explained later.

The frame member 31 and the parts supported thereby is a mechanism belonging to a peeling machine and is shown in these drawings for illustrative purposes only. In brief, the parts mentioned include two horizontal parallel rods 129 and 130. Spring claws 131 and 132 depend from rod 129, while rod 130 carries similar members (not shown) to pair therewith. The claws 131 and 132 are spaced to engage a fruit 133 and lift it from the fruit cup of the present invention.

A compound sleeve 134 on rods 129 and 130 is free to slide thereon as are sleeves 135 and 136, and between which coupling is had. The coupled group is operatively connected to a vertical operating shaft 137 through the agency of the link 138 and the offset arm 139. Other linkage, not shown, is intermediate shaft 137 and the main drive shaft 140 of the machine (Figure 5) and imparts reciprocating motion to said shaft 137. Thus, when the shaft 137 is turned in a clockwise direction, as viewed from above, the crank 139 carries the fruit arms 131 and 132 with the fruit 133 forward to engage the fruit with a blade 141 which passes between the pairs of arms 131 and 132 to split the fruit longitudinally in half. The two halves are then taken care of by the machine of which the present invention is a part in the usual manner for peeling and coring.

Supported by a rod 171 at the top of the conveying apparatus of the machine is a flat metal strip 170 which is free to swing about said rod as held by the pendant couplings 173. Only one of the couplings 173 is shown, the other being at the opposite end of the strip 170 which is not shown. The bar 170 serves as a track for rollers 172 and impingement is had therebetween tending to close fingers 131 and 132 when a fruit 133 is within their grasp.

A vertical shaft 142 which is carried in bearings 16 and 142a and other complemental bearings of the machine in vertical alinement therewith, has three horizontal arms 143, 150 and 155 keyed to it at differing elevations. A bearing block 142b secured to the frame member 12 by bolts 142c provides the bearing 142a. The lower arm 143 contains an oblong slot 144 arranged lengthwise of the body of the arm. There is within said slot a pin 145 projecting upwardly from a connecting link 146.

The opposite end of the link 146 is hingedly locked within the bifurcated end of a second connecting rod 147 by means of a pin 148. A cam not shown but keyed to the drive shaft 140 of the machine cooperates with the cam follower 149 to transmit oscillatory motion to shaft 142 through the linkage comprising links 146 and 147 and the arm 143. Arrangement is had for the pin 145 to be free to move within the slot 144 so that motion will not be imparted to the shaft 142 when the cam follower is near its most forward position. Instead of imparting movement to the arm 143 and the shaft 142 when the arm 143 nears extended alinement with the link 147, the pin 145 will slide to an end of the slot 144. Only the desired portion of movement available from the cam follower 149 is communicated to the shaft 142.

A rocker arm 150 is locked to the pivoted member 142 and in the same horizontal plane with the adjustable link 106 (Figures 1 and 5). Connection is had between the arm 150 and the link head 151 by means of a pin 152. Standard means 153 enjoins the heads 151 and 107, whereby length of the link 106 is obtained to measurably determine the angular position of the compound cam 89 for a given setting of shaft 142.

The lever 36a is connected to the arm 155 by a link 154. Connection is had to the lever 36a at the extended end of the arm 37 as shown in Figures 2 and 5.

Figure 5 discloses a vertical shaft 157 of the peeling machine and driven by virtue of a pinion (not shown) in mesh with a second pinion (not shown) on main driving shaft 140. Sprocket wheel 79 is keyed to the shaft 157. Operative connection is had to the feeding device through the medium of the chain 78.

Reference will be had to the various fruit cups at a multiple of stations indicated by the letters A, B, C and D (Figure 5).

The machine is set in motion by the engagement of shaft 140 with means (not shown) for rotating said shaft. Hence, the chain 78 is effected to turn the sprocket 77, which in turn rotates the arcuate bearing surface 76 and the plate 69. The bearing surface 76 conforms to cut-away sections 86 in the Geneva cam and effectively locks said cam against rotation while there is contact therebetween.

With continued turning of the sprocket 77 in a clockwise direction (Figure 5), roller 72 is presented within the slot 85 between stations B and C to bear against the side thereof indicated by the indicia 170. Simultaneously to the roller striking the slot side 170 the corner 160 of cam 76 arrives at the point midway the ends of the arcuate section 86. Hence, clearance is provided by the concave arcuate sweep between the points 160 and 161 of cam 76 to permit the turning of the star points 171 and 172 of the cam 183. As the Geneva cam completes one-sixth of a revolution, roller bearing 72 rolls along the slot edge 170 to emerge from slot 85, and the point 161 of the cam 76 enters the succeeding cavity 86 as a stop to prevent further turning of said Geneva cam. In this manner, the turret 96 which is coupled to the cam 83 by the sleeve 80 is disposed to intermittently rotate one-sixth of a revolution contingent upon each complete revolution of sprocket 77.

When a fruit cup is at station A, a pear is placed therein with stem outermost, as illustrated in Figure 5. The next consecutive movement of the turret brings the fruit cup to station B. Offset shaft 61 is so deformed as to permit the passage thereby of the outer end of the fruit enroute to station B. Concurrently with the movement to station B, the roller 100 (see Figures 2, 3 and 5) comes into rolling contact with arm 65 to turn the crank member 61, hence the lever 64, and to displace slide 41 outwardly, so that the spacer bar 50 will not be struck by the end of the fruit 133. Just before station B is reached the roller 100 overruns the end of the arm 65, which incident allows the coiled spring 55 to draw the abutment 50 against the end of the pear 133. Means for adjusting the interval between bar 50 and blade 48 is provided in the form of an aperture 51a shown in Figure 4. In this manner, the bar 50, in conjunction with the spring 55, will locate the blade a greater or lesser distance from the end of the fruit.

A second important event concurring with the arrival of the fruit at station B relates to the movable element of the feed cup 111. The projection 129 of the leaf spring 127 comes in contact with the roller 125 of the fruit cup slightly previous to the arrival of the cup at station B. As the cup is advanced the remaining distance to station B, the roller 125 is held stationary by the spring projection 129, thus causing the crank 119 and the shaft 113 to turn in a counter-clockwise direction, Figure 7, to carry the movable side member 111 toward the side 110 of the cup. In this manner the fruit is firmly clasped within the cup upon arrival at station B.

While the fruit is thus securely held and the turret is stationary at station B, the cam follower 149, Figure 1, is shifted forwardly, or in the opposite direction indicated by the arrow on connecting rod 147. Consequently the shaft 142 is turned in an anti-clockwise direction to rotate the cam 89 and lever 36a clockwise as viewed from above. Such movement of the flange 91 carries the inclined surface 92 beneath the roller 104 to elevate the staff 101 and to rest the roller 104 upon the surface 93.

Incident to the raising of the fruit 133 in the manner described, the stem bearing end thereof is carried upwardly past the blade 48 to be severed from the main body of the fruit. The amount of fruit removed with the stem is determined by the perpendicular distance between the stop 50 and the blade 48. Since the lever 36a is given a movement at the same time that the cam 89 is turned for elevating the fruit, the blade 48 is carried about the shaft 28 to effect a drawing movement to such blade as the fruit is elevated thereagainst. This drawing movement of the blade 48 assists in the severing operation upon the fruit to result in a clean slice where the stem is removed. When the feed cup is entirely elevated, the roller 125 has cleared the spring projection 129 and the side wall 111 releases its grasp on the fruit.

Concurrent to the shifting of the fruit to position C, the cam follower 149 effects a counter-clockwise shifting of the cam 89 and the lever 36a about the axis within the rod 28. Thus, section 93 of the cam 89 and roller 104 are displaced counter-clockwise as viewed from above and in concert so that the feed cup retains its elevation as it is transferred to station C. The retrogressive movement of lever 36a places the blade 48 in a position for performing another slicing movement.

Immediately after the transfer of the fruit cup which is under inspection to position C, the shaft 137 of the machine turns to operate the arm 139, whereby the clamps 131 and 132 are drawn back to hover around the fruit in the manner shown in Figure 1. Actual engagement of the clamps 131 and 132 is had when the bar 170 is manipulated, by means not shown interior of the peeling machine. Said manipulating means displaces the bar 170 about the rod 171 to engage the rollers 172 and thus pivot the sleeves 135 and 136 about their respective rods 129 and 130.

When this engagement is had, cam 89 is again operated in a clockwise direction with reference from above, as before explained, to elevate the next following staff 101. Meanwhile, the shaft 101 under immediate discussion and at station C is lowered by the declined section of the upper flange 90 hereinabove described as being beyond section 94a in Figure 1. Said declined section presses upon the upper side of the roller 104 as the cam 89 is rotated. Subsequent to the lowering of the feed cup at station C, the fruit 133 is carried inwardly of the machine by the conveying mechanism comprising the clamps 131 and 132. The bar 170 presses rollers 172 during the inward movement of the fruit to retain the impingement of fingers 131 and 132 upon such fruit.

The present embodiment of the invention, the utility of which is to treat fruit by removing stem ends preliminary to feeding them to a splitting, peeling and (or) coring machine, has in its favor, additional to a superior final result, easier manual feeding than has heretofore been employed. While station A in the above description is selected as the position at which a pear may be inserted into a feed cup, any of the cups on the lowered state from stations D and A, inclusive, will serve as well, thereby providing possibility of supplying the turret with several pears simultaneously.

What is claimed as new and is desired to be secured by Letters Patent of the United States is:

1. In a fruit treating apparatus, a fruit stemming mechanism comprising a main body having a slot, a sliding member in said slot, means for urging said sliding member toward an end of said slot, a blade depending from said sliding member, a spacing bar depending from said sliding member at a selected distance from said blade, a fruit holding cup for presenting a fruit to said stemming mechanism, and means for displacing said sliding member, blade and spacing bar away from said cup and said fruit against the force of said urging means and thereafter releasing said displaced parts, said member being replaced by said urging means to position said spacer bar in contact with said fruit thereby gauging the position of said blade to said fruit.

2. In a fruit treating device, a mechanism for removing a portion of a fruit and comprising a movable member for holding such fruit, a lever, a block fixed with respect to said lever and having a slot and a bearing, a slug reciprocally confined in said slot, a second lever operating in said bearing and engaging said slug, a blade depending from said slug, spacing means depending from said slug in juxtaposition to said blade, means movable with said fruit holding member for acting upon said second lever for displacing said slug, blade and spacing means along said slot from a position to which said fruit is to be moved and releasing said displaced parts after the fruit reaches said position, means for yieldingly urging said slug oppositely along said slot to place said spacing means against said positioned fruit whereby said blade is selectively placed to said fruit, and means for pivoting the first lever for drawing said blade along the fruit.

3. In a fruit treating apparatus, a turret disposed for rotation, fruit holding cups positioned about said turret for movement therewith and for movement relatively thereto, means for effecting intermittent rotation to said turret to successively present said cups at a station, a blade at said station and adapted to be drawn longitudinally of its edge and transversely of the path of displacement of said cups, means for displacing said cups while at said station to force a section of the fruit therein against the edge of said knife, and means for moving said knife simultaneously with the actuation of the means for displacing said cups.

4. Fruit treating apparatus comprising a turret having a plurality of bearings about its periphery, fruit receptacles disposed in said bearings for vertical reciprocation and normally being at their lower reciprocal limit, fruit bobbing means adjacent said turret and comprising a bobbing knife having a cutting edge disposed above said receptacles, knife mounting means for the movement of said knife longitudinally of its edge, means for imparting intermittent movement to said turret to cause successive receptacles to register with said bobbing means, means for lifting the registered receptacle, the lifting movement presenting a section of a fruit in the registered receptacle to said blade, and blade moving means operable concurrently with the lifting of said receptacle.

5. Fruit treating apparatus comprising a turret having a series of bearings about the periphery thereof, receptacles in said bearings, each receptacle being vertically movable in its bearing and supporting a fruit with a section thereof projecting outwardly therefrom, a movably mounted fruit bobbing knife adjacent to and above said turret, a fruit abutting member below and offset from said knife, said abutting member and said knife being movable together, means for imparting intermittent movement to said turret to successively register said receptacles with said bobbing knife, means operating in timed relation with the movement of said turret to lift the registered receptacle, means urging said knife and abutting member in the direction of a registered receptacle for positioning said abutting member against the projecting end section of a fruit therein and said knife selectively above such fruit, and means movable with said turret for maintaining said knife and abutting member away from said receptacle during movement of the receptacle into such registry and for releasing said knife and abutting member coincidentally with such registry, said receptacle lifting means being operable subsequently to the movement of said abutting member toward the registered fruit receptacle.

6. In a pear treating apparatus, a turret having a bearing adjacent to its periphery, a fruit receptacle movable in said bearing in parallelism with the axis of rotation of said turret, means movable toward and away from said receptacle for severing an end section from a fruit therein and comprising a knife, a fruit abutting member, means holding said knife and said abutting member in spaced relation, and means for moving said severing means, said abutting member contacting a fruit in said receptacle to arrest the movement of said severing means in the direction of the receptacle, and said spacing means maintaining said knife in predetermined spaced relation to said abutment member to selectively position the knife relative to the fruit engaged by said abutting member, and means for moving said receptacle to carry the fruit against the selectively positioned knife.

7. Fruit treating apparatus comprising a series of cups movable along a predetermined course, each of said cups holding a fruit with an end section of the latter projecting therefrom, a station in said course, means for moving said members and for successively stopping them at said station, means at said station for elevating each receptacle while in registry therewith, a knife movably disposed at said station for bobbing a section of the projecting portion from such fruit, a member below said knife and to one side thereof and movable therewith to abut against the projecting section of the fruit, means for urging said abutting member in the direction of a registered receptacle, means precluding movement of said abutting member and said knife by said urging means during movement of a receptacle into registry with such station and thereafter releasing said abutting member and knife, said urging means moving the released abutting member against the projecting section of a fruit in a registered receptacle, said elevating means thereafter lifting the fruit against said knife, and means for moving said knife longitudinally of its edge during such registry.

8. In apparatus for severing an end section from a pear, a turret, a plurality of cup mounting means upon said turret, fruit holding cups in said mounting means and being relatively movable axially of said turret, a bobbing device movable radially of said turret and comprising gauge means for engaging an end section of a fruit in a cup, and a knife selectively spaced from said gauge means, means for intermittently rotating said turret to successively position said cups between said bobbing device and the axis of rotation of said turret, means operating in timed relation with the movement of said turret to move the bobbing device toward the registered cups to engage the end section of the fruit therein, and means for moving said receptacle axially of said turret to carry the engaged section of fruit against and past said knife.

9. In a fruit treating machine, a loading device comprising a turret rotatable upon a vertical axis, open sided fruit cups mounted about the periphery of said turret for reciprocation axially thereof and normally at their lower reciprocal limit, there being a station at the periphery of said trurret, mechanism at said station and above said turret for bobbing an end section from fruit contained in said cups, means intermittently rotating said turret and successively registering said station, said bobbing mechanism comprising a fruit gauge member movable diametrically of the open side of a registered cup and having a section for abutting an end of a fruit in a registered cup, a knife above and in substantial parallelism with the abutting section of said gauge member, and means for moving a registered cup upwardly to advance a fruit therein in a direction parallel to the abutting section of said gauge member and past said knife.

10. Fruit treating apparatus comprising a turret having a plurality of fruit cups about the periphery thereof, said cups normally occupying one plane and being movable axially of said turret to a second plane, a fruit bobbing device adjacent the periphery of said turret and movable radially thereof, means moving said turret intermittently to register said cups one at a time with said bobbing device, said bobbing device comprising a fruit abutment member in the first plane and movable with said device toward a registered cup, and a knife between said fruit abutment member and the second plane and selectively staggered with respect to said member, means for moving said device toward a registered cup, and means operating subsequently to such movement for advancing said registered cup from the first to the second of such planes.

11. In a fruit treating machine, a loading mechanism comprising a turret, fruit cups in said turret and reciprocable in parallelism with the axis of said turret, a mechanism for transferring fruit from said cups one at a time to said fruit treating machine, said transfer mechanism being above the normal position of said cups, a knife intermediate said transfer mechanism and said turret and movable radially of said turret, means for intermittently moving said turret, said transfer mechanism, and said knife in synchronism, and a cam operable with each movement of said turret to reciprocate one of said cups upwardly across the cutting edge of said knife and into registry with said transfer mechanism and thereafter to its normal position upon said turret.

12. In a fruit treating machine, a loading mechanism comprising a turret, fruit cups on said turret and reciprocal in parallelism with the axis of said turret, a mechanism for transferring fruit from said cups one at a time to said fruit treating machine, said transfer mechanism being above the normal position of said cups, a bobbing device movable radially of said turret and positioned between said turret and said transfer mechanism, said bobbing device comprising a knife, and a fruit gauge member predeterminedly spaced therefrom, a plurality of means for intermittently moving said turret, said cups, said transfer mechanism, and said bobbing device in synchronism, one of said cups during such synchronic movement being registered with said transfer mechanism coincident with each movement of said turret and the movement of such cup axially of said turret, the movement of said bobbing device being governed by the abutment of said gauge member upon a fruit in the cup registered with said transfer mechanism.

13. In a fruit treating machine, a loading mechanism comprising a turret, fruit cups on said turret and reciprocal in parallelism with the axis of said turret, a mechanism for transferring fruit from said cups one at a time to said fruit treating machine, said transfer mechanism being above the normal position of said cups, a bobbing device movable radially of said turret and positioned between said turret and said transfer mechanism, said bobbing device comprising a knife, a fruit gauge member, means urging said bobbing device in the direction of the axis of said turret and means movable with said turret for first restraining said bobbing device from movement by said urging means and thereafter releasing said device, a plurality of means for intermittently moving said turret, said cups, and said transfer mechanism in synchronism, one of said cups being registered with said transfer mechanism coincidentally with each movement of said turret and the movement of such cup axially of said turret, said restraining means releasing said bobbing device prior to the movement of such cup into such registry, movement of said bobbing device by said urging means being in the direction of such registered cup and being limited by said gauge member abutting against a fruit in such cup to predeterminedly space said knife relatively to such fruit.

14. In a fruit treating machine, loading mechanism comprising a turret, fruit cups about the periphery of said turret, said cups being movable with said turret in a first plane, movable axially thereof into a second plane, and movable therewith in such second plane, a fruit bobbing mechanism adjacent the periphery of said turret, a mechanism operating in such second plane for transferring fruit from said loading mechanism to said machine, means intermittently rotating said turret to cause registry of said cups in seriatim with said bobbing mechanism, means for moving a registered cup from the first of said planes to the second plane and into registry with said transfer mechanism, and means for actuating said bobbing mechanism coincidentally with the movement of the cup registered therewith into registry with said transfer mechanism.

MARK EWALD.